Aug. 11, 1936.  L. G. FARLEY  2,050,566
BATTERY TERMINAL AND CABLE CLAMP
Filed Dec. 2, 1935
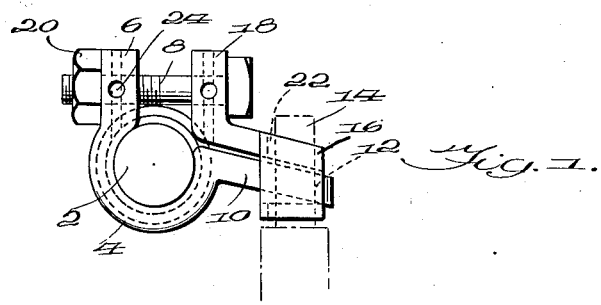
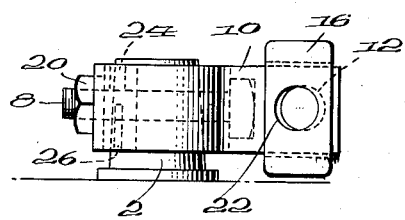
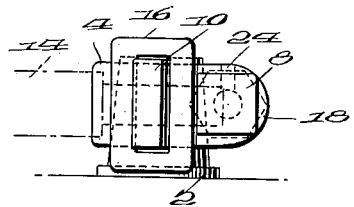
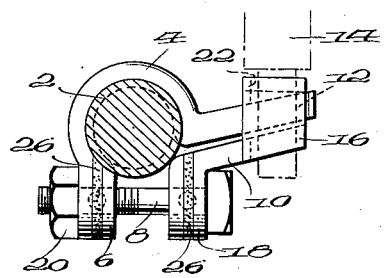
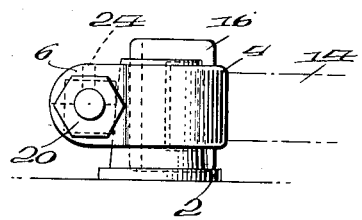
Inventor
Lehman G. Farley
By Vernon E. Hodges
H. Hamlin Hodges
his Attorneys

UNITED STATES PATENT OFFICE 2,050,566

BATTERY TERMINAL AND CABLE CLAMP

Lehman G. Farley, Montgomery, Pa.

Application December 2, 1935, Serial No. 52,568

5 Claims. (Cl. 173—259)

This invention relates to an improvement in battery terminals and cable clamps.

Battery terminal clamps in common use to-day are permanently secured to an end of a cable which is to be secured to a battery terminal.

An object of my battery terminal clamp is to provide a clamp which will not only clamp the battery terminal but will also clamp a cable which is to be electrically secured to the battery terminal.

A further object of my invention is to provide suitable wicks or other means by which a lubricant may be applied to the terminal clamp and keep the clamp and battery terminal lubricated to avoid corrosion.

A further object of my invention is to provide a combined cable and battery terminal clamp made in two parts and secured in assembled position by a standard nut and bolt.

In the accompanying drawing:

Fig. 1 is a plan view;
Fig. 2 is a front elevation;
Fig. 3 is a side elevation;
Fig. 4 is a bottom plan view; and
Fig. 5 is a side elevation of the side opposite the side in Fig. 3.

The battery terminal 2 is standard in construction and is adapted to be partially surrounded by the curved jaw 4 of my cable and battery terminal clamp. From one end of the curved jaw 4, I provide an ear 6, which ear is drilled for the bolt 8 to pass through in a manner which will be described more fully herein. The other end of the jaw 4 is provided with a tongue 10, which is substantially longer than the ear 6. This tongue 10 is also provided with an aperture 12 which is adapted to receive one end of a cable 14.

I provide a slidable collar 16 which is adapted to slide over the tongue 10. This collar 16 is provided with an ear 18, which is provided with a hole therethrough so that the bolt 8 may pass through the hole in the ear 18, and the hole in the ear 6 subsequently to be secured in position by the standard nut 20.

The collar 16 is provided with apertures 22 on each side thereof which apertures 22 will be substantially in registry with the aperture 12 of the tongue 10 when the collar is placed over the tongue 10. With the collar 16 in position with the apertures 12 and 22 in approximate registry, the end of the cable 14 is passed therethrough as particularly shown in Figs. 1 and 4, after which time the collar 16 is drawn toward the battery terminal by tightening the nut 20, thus drawing together the ears 6 and 18.

As the ear 18 is drawn toward the ear 6, the apertures 12 and 22 will slide apart as clearly indicated in Figs. 1 and 4, and the cable 14 will be securely held in its adjusted position.

When the collar 16 and the ear 18 can slide no closer to the ear 6, any additional pressure which is applied by tightening the bolt 20 will tend to bend the curved jaw 4 around the battery terminal 2, and thus securely hold the curved jaw on the battery terminal. Preferably the ear 6 and the tongue 10 do not extend from the jaw 4 at right-angles, and, therefore, the ears 6 and 18 will not lie in parallel planes. By tightening the nut 20 on the bolt 8 the ears 6 and 18 will be drawn into approximately parallel planes and thus the jaw 4 will be tightened around the terminal 2 as the ear 6 and the tongue 10 are drawn toward approximate right-angles.

On the upper side of the ears 6 and 18, I provide holes 24, which extend through the ears 6 and 18 on the upper side thereof. On the lower side of the ears 6 and 18, I cut channels into which I position wicks of felt or other absorbent material 26. These wicks 26 extend through the lower side of the ears 6 and 18 to the holes through which the bolt 8 passes, and consequently are in a position to absorb any liquid material which is supplied through holes 24. By supplying a liquid such as a lubricant, to the holes 24 and consequently to the wick 26, the bolt 8 is moistened or lubricated and also the liquid is conducted to the terminal 2, consequently the curved jaw 4 and the bolt 8 are kept sufficiently moist or lubricated to prevent the corrosion which commonly occurs on a battery terminal.

It will be seen that by the provision of a simple clamp, such as the one which I have disclosed, an electric cable may be readily secured to a battery terminal without the customary difficulty of welding, soldering or otherwise securing the cable to a battery terminal clamp and then securing the clamp to the battery terminal.

I find that in using my combination cable and battery terminal clamp, it is a relatively simple matter to make a satisfactory electrical connection between a battery terminal and a cable. It may be readily seen that my clamp may be easily removed from the battery terminal and/or the cable at any time that it becomes necessary to disconnect a cable from a battery for replacing a battery or any other necessary adjustment which must be made.

It will be understood that many minor changes may be made from time to time in the exact configuration of the curved jaw 4, the tongue 10 and the slidable collar 16 as well as the ears 6 and 18 without departing from the spirit of the invention and the scope of the appended claims.

While I have illustrated a jaw from which the ear 18 and the tongue 10 extend substantially away from right-angles, it will be understood that my clamp could be made with the ear 18 and the tongue 10 extending from the jaw 4 at approximate right-angles without materially affecting the efficiency of the clamp.

I claim:

1. A battery cable clamp including a curved jaw, a tongue extending from one end of said jaw, an aperture in said tongue, a slidable collar surrounding said tongue, apertures in said collar approximately in registry with the aperture in said tongue, an ear on the end of said curved jaw remote from said tongue, an ear on said slidable collar, and means for drawing said ears together.

2. A battery cable clamp including a curved jaw adapted to partially encircle a battery terminal, a tongue extending from one end of said jaw, an aperture in said tongue, a collar slidable on said tongue, apertures in said collar approximately in registry with the aperture in said tongue, said apertures adapted to receive a cable, an ear on the end of the said jaw remote from said tongue, an ear on the end of said collar, and means for drawing said ears together.

3. In a battery terminal clamp, an ear extending from one end thereof, a tongue extending from the other end thereof, a collar slidable on said tongue, apertures in said collar and tongue in approximate registry, said apertures adapted to engage a cable, an ear attached to said slidable collar, and means for drawing said ear and collar inwardly to secure the cable in place and to tighten the jaw on the battery terminal.

4. In a battery terminal clamp, an ear extending from one end thereof, a tongue extending from the other end thereof, a collar slidable on said tongue, cable securing means in said tongue and collar, an ear on said collar in alignment with the ear on said jaw, lubricant conducting means in said ears, means for drawing said ears together, and means within said ears for supplying a lubricant to said lubricant conducting means.

5. In a battery terminal clamp, an ear extending from one end thereof, a tongue extending from the other end thereof, a collar slidable on said tongue, apertures in said tongue and collar in approximate alignment, an ear on said collar in alignment with the ear on the said jaw, wicks positioned partially within said ears, holes communicating with said wicks and the outside of said ears, and means for drawing said ears together.

LEHMAN G. FARLEY.